US009572200B2

(12) United States Patent
Rateiczak et al.

(10) Patent No.: US 9,572,200 B2
(45) Date of Patent: Feb. 14, 2017

(54) DISK HAVING AN ELECTRIC CONNECTING ELEMENT AND COMPENSATOR PLATES

(71) Applicant: SAINT-GOBAIN GLASS FRANCE, Courbevoie (FR)

(72) Inventors: Mitja Rateiczak, Wuerselen (DE); Bernhard Reul, Herzogenrath (DE); Klaus Schmalbuch, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/439,652

(22) PCT Filed: Jul. 18, 2013

(86) PCT No.: PCT/EP2013/065175

§ 371 (c)(1),
(2) Date: Apr. 29, 2015

(87) PCT Pub. No.: WO2014/079595

PCT Pub. Date: May 30, 2014

(65) Prior Publication Data

US 2015/0296569 A1 Oct. 15, 2015

(30) Foreign Application Priority Data

Nov. 21, 2012 (EP) .................................... 12193521

(51) Int. Cl.

*B60L 1/02* (2006.01)
*H05B 3/84* (2006.01)
*H05B 3/06* (2006.01)

(52) U.S. Cl.

CPC . *H05B 3/84* (2013.01); *H05B 3/06* (2013.01)

(58) Field of Classification Search

CPC ........... H05H 1/111; H01R 4/02; H01R 11/11; H01R 13/03; H01R 13/22; H01R 13/111; H01R 12/707; H01R 12/57; H01R 12/718; H01R 2101/00; H05B 3/84; H05B 3/06; H05B 2203/016; B23K 35/262; B23K 35/264; B23K 35/0222; B23K 35/3006; B23K 35/0238; B23K 2201/36; B23K 2201/12; B32B 15/01; C22C 12/00; C22C 13/00

See application file for complete search history.

(56) References Cited

U.S. PATENT DOCUMENTS 2,644,066 A 6/1953 Glynn
4,023,008 A 5/1977 Durussel
(Continued)

FOREIGN PATENT DOCUMENTS

CA 2835381 A1 11/2012
DE 102009016353 10/2010
(Continued)

OTHER PUBLICATIONS

PCT Written Opinion mailed on Sep. 27, 2013 for PCT/EP2013/065175 filed on Jul. 18, 2013 in the name of Saint-Gobain Glass France.
(Continued)

*Primary Examiner* — Shawntina Fuqua
(74) *Attorney, Agent, or Firm* — Steinfl & Bruno, LLP

(57) ABSTRACT

A disk with at least one connecting element having compensator plates, including; a substrate having an electrically conductive structure on at least one partial region of the substrate, at least one compensator plate on at least one partial region of the conductive structure, at least one electric connecting element on at least one partial region of the at least one compensator plate, a lead-free soldering mass which connects the compensator plate via at least one contact surface including; one partial region of the electrically conductive structure, wherein the difference of the
(Continued)

thermal expansion coefficient of the substrate and the compensator plate is less than $5\times10^{-6}/°$ C. and wherein the connecting element comprises copper.

14 Claims, 7 Drawing Sheets

(56) References Cited

U.S. PATENT DOCUMENTS

| | | | | |
|---|---|---|---|---|
| 2006/0102610 | A1 | 5/2006 | Hoepfner et al. | |
| 2007/0224842 | A1 * | 9/2007 | Hoepfner ................. | H01R 4/02 439/34 |
| 2009/0170380 | A1 | 7/2009 | Lyon | |
| 2014/0110166 | A1 | 4/2014 | Degen et al. | |

FOREIGN PATENT DOCUMENTS

| | | | |
|---|---|---|---|
| EP | 1942703 | | 7/2008 |
| EP | 2339894 | | 6/2011 |
| EP | 2408260 | | 1/2012 |
| WO | 0058051 | | 10/2000 |
| WO | 2007110610 | | 10/2007 |
| WO | 2012152542 | A1 | 11/2012 |
| WO | 2012152543 | * | 11/2012 |

OTHER PUBLICATIONS

PCT Written Opinion mailed on Oct. 16, 2013 for PCT/EP2013/064987 filed on Jul. 16, 2013 in the name of Saint-Gobain Glass France.

PCT International Search Report mailed on Sep. 27, 2013 for PCT/EP2013/065175 filed on Jul. 18, 2013 in the name of Saint-Gobain Glass France.

PCT International Search Report mailed on Oct. 16, 2013 for PCT/EP2013/064987 filed on Jul. 16, 2013 in the name of Saint-Gobain Glass France.

Non-Final Office Action for U.S. Appl. No. 14/439,852, filed Apr. 30, 2015 on behalf of Klaus Schmalbuch, et al.; Mail Date: Feb. 3, 2016. 14 pages.

Final Office Action for U.S. Appl. No. 14/439,852, filed Apr. 30, 2015 on behalf of Klaus Schmalbuch, et al.; Mail Date: May 23, 2016. 17 pages.

* cited by examiner

DISK HAVING AN ELECTRIC CONNECTING ELEMENT AND COMPENSATOR PLATES

CROSS REFERENCE TO RELATED APPLICATIONS

The present application is the US national stage of International Patent Application PCT/EP2013/065175 filed on Jul. 18, 2013 which, in turn, claims priority to European application 12193521.7 filed on Nov. 21, 2012.

BACKGROUND

The invention relates to a pane with an electrical connection element, an economical and environmentally friendly method for its production, and its use.

The invention further relates to a pane with an electrical connection element for motor vehicles with electrically conductive structures such as, for instance, heating conductors or antenna conductors. The electrically conductive structures are customarily connected to the onboard electrical system via soldered-on electrical connection elements. Due to different coefficients of thermal expansion of the materials used, mechanical stresses occur during production and operation that strain the panes and can cause breakage of the pane.

Lead-containing solders have high ductility that can compensate the mechanical stresses occurring between an electrical connection element and the pane by plastic deformation. However, because of the End of Life Vehicles Directive 2000/53/EC, lead-containing solders must be replaced by leadfree solders within the EC. The Directive is referred to, in summary, by the acronym ELV (End of Life Vehicles). Its objective is, as a result of the massive increase in disposable electronics, to ban extremely problematic components from products. The substances affected are lead, mercury, cadmium, and chromium. This relates, among other things, to the implementation of leadfree soldering materials in electrical applications on glass and the introduction of corresponding replacement products.

The leadfree solder compounds known to date, as disclosed, for example, in EP 2 339 894 A1 and WO 2000058051, are, however, not capable of compensating mechanical stresses to the same extent as lead due to their lower ductility. The customary copper-containing connection elements have, however, a higher coefficient of thermal expansion than glass (CTE(copper)=$16.8\times10^{-6}$/° C.), as a result of which damage to glass occurs upon thermal expansion of the copper. For this reason, connection elements that have a low coefficient of thermal expansion, preferably on the order of magnitude of soda lime glass ($8.3\times10^{-6}$/° C. for 0° C.-320° C.), are preferably used in conjunction with leadfree solder compounds. Such connection elements hardly expand upon heating and compensate the developing stresses.

EP 1 942 703 A2 discloses an electrical connection element on panes of motor vehicles, wherein the difference of the coefficients of thermal expansion of the pane and the electrical connection element is $<5\times10^{-6}$/° C. and the connection element contains predominantly titanium. In order to enable adequate mechanical stability and processability, it is proposed to use an excess of soldering compound. The excess of soldering compound flows out of the intermediate space between the connection element and the electrically conductive structure. The excess of soldering compound causes high mechanical stresses in the glass pane. These mechanical stresses ultimately lead to breakage of the pane.

In addition, titanium has poor solderability. This results in poor adhesion of the connection element on the pane. Moreover, the connection element must be connected to the onboard electrical system via an electrically conductive material, for example, copper, possibly by welding. Titanium has poor weldability.

EP 2 408 260 A1 describes the use of iron-nickel or iron-nickel-cobalt alloys such as Kovar or Invar, which have a low coefficient of thermal expansion (CTE). Both Kovar (CTE=$5\times10^{-6}$/° C.) and Invar (CTE up to $0.55\times10^{-6}$/° C. depending on composition) have a lower CTE than soda lime glass and compensate mechanical stresses. Invar has such a low coefficient of thermal expansion that overcompensation of these mechanical stresses occurs. This results in compressive stresses in the glass or tensile stresses in the alloy which are, however, considered noncritical.

The conventional connection elements made of copper, which are used in conjunction with lead-containing soldering compounds, are unsuitable for soldering with the known leadfree soldering compounds on glass due to their high coefficient of expansion. Connection elements made of iron or titanium do, in fact, have a lower coefficient of expansion and are compatible with leadfree soldering compounds; however, these materials are substantially more difficult to form. Thus, the service life of the tools necessary for the production of the connection elements is reduced, which results in an increase in production costs. Furthermore, with changing materials and shapes of the connection elements, the basic conditions of the soldering procedure have to continually be varied. Different connection elements also have a different mechanical robustness relative to pulling forces. Standardization would thus be desirable to ensure consistent mechanical stability and uniform soldering behavior.

SUMMARY

The object of the present invention is to provide a pane with an electrical connection element as well as an economical and environmentally friendly method for its production, wherein critical mechanical stresses in the pane can be avoided and the manufacturing process is simplified by standardization of the soldering procedure regardless of the material and the shape of the connection element.

The object of the present invention is accomplished according to the invention by a pane with a connection element, a method for its production, and its use in accordance with independent claims 1, 13, and 14. Preferred embodiments are apparent from the subclaims.

The object of the present invention is accomplished according to the invention by a pane with at least one connection element with compensator plates. The pane comprises at least one substrate with an electrically conductive structure on at least one part of the substrate, at least one compensator plate on at least one part of the conductive structure, at least one electrical connection element on at least one part of the compensator plate as well as a leadfree soldering compound, which connects the compensator plate via at least one contact surface to at least one part of the electrically conductive structure. The difference of the coefficients of thermal expansion of the substrate and the compensator plates is less than $5\times10^{-6}$/° C., and the connection element contains copper.

The coefficient of thermal expansion of the compensator plates is preferably between $9\times10^{-6}$/° C. and $13\times10^{-6}$/° C., particularly preferably between $10\times10^{-6}$/° C. and $12\times10^{-6}$/°

C., most particularly preferably between $10\times10^{-6}/°$ C. and $11\times10^{-6}/°$ C. in a temperature range from 0° C. to 300° C.

Through use of the compensator plate according to the invention, even the conventional connection elements made of copper can be used in conjunction with leadfree soldering compounds. According to the prior art, the connection element is soldered by means of the leadfree soldering compound without a compensator plate directly onto the electrically conductive structure of the substrate, as result of which damage of the substrate occurs in temperature cycling tests. Such damages are not observed on the pane according to the invention since the compensator plate compensates the stresses that occur. The material of the compensator plates is selected such that the difference of the coefficients of thermal expansion of the substrate and the compensator plates is less than $5\times10^{-6}/°$ C. Thus, the substrate and the compensator plates expand during heating to the same extent and damage to the solder joint is avoided. Since the copper-containing connection elements conventional in the past can still be used, no tool conversion is necessary. Moreover, copper-containing materials are, as a rule, readily formable. The connection elements known according to the prior art, which can also be used in conjunction with leadfree soldering compounds, are, in contrast, made from poorly formable materials such as steel or titanium. For this reason, the service life of tools is significantly higher with the forming of copper-containing connection elements. The use according to the invention of compensator plates thus results in a reduction of production costs with regard to the forming process.

Moreover, the connection elements made of steel or titanium solderable with leadfree soldering compounds according to the prior art have significantly higher electrical resistance compared to the conventional copper-containing connection elements. By means of the combination according to the invention of the compensator plates, which ensure good thermostability of the solder joint, with copper-containing connection elements, which have high electrical conductivity, the advantages of the various materials are optimally utilized without the disadvantageous material properties manifesting themselves. Accordingly, the proportion of the material with high resistance can be reduced to a minimum while retaining the same temperature stability of the pane.

Furthermore, through use of the compensator plate according to the invention, standardization of the soldering procedure is achieved. The compensator plates form the contact basis for connection elements and other connectors of all types and thus serve not only as compensators but also as adapters. Through use of the always identical standardized compensator plates, the conditions on the solder joint remain constant and the soldering procedure need not be adapted even with a change in the shapes and materials of the connection elements. In addition, the mechanical conditions on the solder joint remain constant such that the pulling forces are independent of the shape of the connection element.

The number of compensator plates used depends on the geometry of the connection element. If the connection element is intended to be connected to the electrically conductive structure via only one surface, one compensator plate on the side of the connection element that is to be connected to the electrically conductive structure suffices.

In a preferred embodiment, the electrical connection element is electrically conductively connected via a first compensator plate and a second compensator plate to the electrically conductive structure. The connection element can, for example, be implemented in the form of a bridge, wherein the connection element has two feet between which there is a raised section that does not make direct surface contact with the electrically conductive structure. The connection element can have both a simple bridge form and more complex bridge forms. The two feet of the connection element rest on the top of one compensator plate each.

The compensator plates have, on their bottom, contact surfaces with which they are applied full surface on the electrically conductive structure. Preferably, the compensator plates and the contact surfaces have no corners. Such a design effects both uniform tensile stress distribution without maximum values at the corners and uniform solder distribution.

The compensator plates contain titanium, iron, nickel, cobalt, molybdenum, copper, zinc, tin, manganese, niobium, and/or chromium and/or alloys thereof.

Preferably, the compensator plates contain a chromium-containing steel with a chromium content greater than or equal to 10.5 wt.-%. Other alloy components such as molybdenum, manganese, or niobium result in improved corrosion resistance or altered mechanical properties such as tensile strength or cold formability.

The compensator plates according to the invention preferably contain at least 66.5 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, 0 wt.-% to 2 wt.-% niobium, and 0 wt.-% to 1 wt.-% titanium. The compensator plates can additionally contain admixtures of other elements, including vanadium, aluminum, and nitrogen.

The compensator plates particularly preferably contain at least 73 wt.-% to 89.5 wt.-% iron, 10.5 wt.-% to 20 wt.-% chromium, 0 wt.-% to 0.5 wt.-% carbon, 0 wt.-% to 2.5 wt.-% nickel, 0 wt.-% to 1 wt.-% manganese, 0 wt.-% to 1.5 wt.-% molybdenum, 0 wt.-% to 1 wt.-% niobium, and 0 wt.-% to 1 wt.-% titanium. Moreover, admixtures of other elements can be contained, including vanadium, aluminum, and nitrogen.

The compensator plates most particularly preferably contain at least 77 wt.-% to 84 wt.-% iron, 16 wt.-% to 18.5 wt.-% chromium, 0 wt.-% to 0.1 wt.-% carbon, 0 wt.-% to 1 wt.-% manganese, 0 wt.-% to 1 wt.-% niobium, 0 wt.-% to 1.5 wt.-% molybdenum, and 0 wt.-% to 1 wt.-% titanium. The compensator plates can contain additional admixtures of other elements, including vanadium, aluminum, and nitrogen.

Chromium-containing steel, in particular so-called stainless steel is available economically. Chromium-containing steel also has, compared to copper and copper alloys, high rigidity, which results in advantageous stability of the compensator plates. Also, compensator plates made of chromium-containing steel have, compared to many conventional connection elements, for example, those made of titanium, improved solderability, resulting from higher thermal conductivity.

Particularly suitable materials for use as compensator plates are chromium-containing steels of material numbers 1.4016, 1.4113, 1.4509, and 1.4510 per EN 10 088-2.

The compensator plates preferably have a material thickness from 0.1 mm to 1 mm, particularly preferably 0.4 mm to 0.8 mm. Within these ranges, sufficient mechanical stability is optimally ensured. The width and the length of the compensator plates can be individually adapted to the connection elements used and the shape of their feet. However, in order to obtain the particularly advantageous standardization of the compensator plates, round, circular, or elliptical shapes, in particular circular shapes, are particularly preferably used. In a most particularly preferred circular embodiment of the compensator plates, they have a diameter from 2 mm to 15 mm, preferably 4 mm to 10 mm.

In addition to copper, the connection element preferably contains titanium, iron, nickel, cobalt, molybdenum, copper, zinc, tin, manganese, niobium, and/or chromium and/or alloys thereof. A suitable material composition is selected according to its electrical resistance.

In a preferred embodiment, the connection element contains 45.0 wt.-% to 99.9 wt.-% copper, 0 wt.-% to 45 wt.-% zinc, 0 wt.-% to 15 wt.-% tin, 0 wt.-% to 30 wt.-% nickel, and 0 wt.-% to 5 wt.-% silicon. In addition to electrolytic copper, a wide variety of brass or bronze alloys, for example, nickel silver or constantan, are suitable as materials.

The connection element particularly preferably contains 58 wt.-% to 99.9 wt.-% copper and 0 wt.-% to 37.0 wt.-% zinc, in particular 60 wt.-% to 80 wt.-% copper and 20 wt.-% to 40 wt.-% zinc.

As a particular example of the material of the connection element, electrolytic copper with the material number CW004A (formerly 2.0065) and CuZn30 with the material number CW505L (formerly 2.0265) should be mentioned.

In a preferred embodiment, the material of the the connection element has electrical resistance between 1.0 μohm.cm and 15 μohm.cm, particularly preferably between 1.5 μohm.cm and 11 μohm.cm. This yields a particularly advantageous combination of compensator plates with a CTE adapted to the substrate and a connection element with very good electrical conductivity. Prior art connection elements that also have a coefficient of thermal expansion adapting to the substrate have higher electrical resistances such that a disadvantageously increased voltage drop occurs.

The material thickness of the connection element is preferably 0 1 mm to 2 mm, particularly preferably 0.2 mm to 1 mm, most particularly preferably 0.3 mm and 0.5 mm. In a preferred embodiment, the material thickness of the connection element is constant over its entire area. This is partly advantageous with regard to simple manufacture of the connection element.

The connection element is connected to the onboard electronics of the motor vehicle via a connecting cable. The electrical contacting of the connection element to the connecting cable can be done via a soldered, welded, or crimped connection.

Connecting cables suitable for the contacting of the connection element are, in principle, all cables that are known to the person skilled in the art for the electrical contacting of an electrically conductive structure. The connecting cable can include, in addition to an electrically conductive core (inner conductor), an insulating, preferably polymeric sheathing, with the insulating sheathing preferably removed in the end region of the connecting cable in order to enable an electrical connection between the connection element and the inner conductor.

The electrically conductive core of the connecting cable can contain, for example, copper, aluminum, and/or silver or alloys or mixtures thereof. The electrically conductive core can be implemented, for example, as a stranded wire conductor or as a solid wire conductor. The cross-section of the electrically conductive core of the connecting cable is determined according to the the current carrying capacity required for the use of the pane according to the invention and can be appropriately selected by the person skilled in the art. The cross-section is, for example, from 0.3 $mm^2$ to 6 $mm^2$.

The connection element is electrically conductively connected to the compensator plates, with the possibility of connecting the elements by means of various soldering or welding techniques. The compensator plates and the connection element are preferably connected by electrode resistance welding, ultrasonic welding, or friction welding.

In an alternative embodiment, the connection element can also be applied on the compensator plates via a screw connection or a plug connection. Such contacting can be realized, for example, by a compensator plate with a threaded pin onto which a connection element with a threaded sleeve is screwed.

In an advantageous embodiment of the invention, the connection element covers only a part of the surface of the compensator plates. A part of the compensator plates thus protrudes laterally under the connection element and is accessible on the compensator plates even after attachment of the connection element. During the soldering of the compensator plates onto the electrically conductive structure, these protrusions can serve for the contacting of the compensator plates.

An electrically conductive structure, which preferably contains silver, particularly preferably silver particles and glass fits, is applied in at least one part of the pane. The electrically conductive structure according to the invention preferably has a layer thickness from 3 μm to 40 μm, particularly preferably from 5 μm to 20 μm, most particularly preferably from 7 μm to 15 μm, and in particular from 8 μm to 12 μm. The compensator plates on which the connection element is applied are connected full surface to one part of the electrically conductive structure via a contact surface. The electrical contacting is done by means of the leadfree soldering compound. The electrically conductive structure can, for example, serve for the contacting of wires or a coating applied on the pane. The electrically conductive structure is applied, for example, in the form of busbars on opposite edges of the pane. A voltage can be applied via the connection elements with compensator plates applied on the busbars, by which means a current flows through the conductive wires or the coating from one busbar to the other and heats the pane. Alternatively to such a heating function, the pane according to the invention is also usable in combination with antenna conductors or also conceivable in any other arrangements in which stable contacting of the pane is necessary.

The substrate preferably contains glass, particularly preferably flat glass, float glass, quartz glass, borosilicate glass, and/or soda lime glass. The substrate can, however, also contain polymers, preferably polyethylene, polypropylene, polycarbonate, polymethyl methacrylate, polystyrene, polybutadiene, polynitriles, polyesters, polyurethane, polyvinyl chloride, polyacrylate, polyamide, polyethylene terephthalate, and/or copolymers or mixtures thereof. The substrate is preferably transparent. The substrate preferably has a thickness from 0 5 mm to 25 mm, particularly preferably from 1 mm to 10 mm, and most particularly preferably from 1.5 mm to 5 mm.

The coefficient of thermal expansion of the substrate is preferably $8\times10^{-6}$/° C. to $9\times10^{-6}$/° C. The substrate preferably contains glass that preferably has a coefficient of thermal expansion from $8.3\times10^{-6}$/° C. to $9\times10^{-6}$/° C. in a temperature range from 0° C. to 300° C.

Optionally, a screenprint that conceals the contacting of the pane in the installed state of the pane is applied on the substrate such that the connection element with compensator plates is not discernible from the outside.

The electrically conductive structure is electrically conductively connected to the compensator plates via the leadfree soldering compound. The leadfree soldering compound is arranged on the contact surfaces that are situated on the bottom of the connection element.

The layer thickness of the leadfree soldering compound is preferably less than or equal to 600 μm, particularly preferably between 150 μm and 600 μm, in particular less than 300 μm.

The leadfree soldering compound is preferably free of lead. This is particularly advantageous with regard to the environmental impact of the pane according to the invention with an electrical connection element. In the context of the invention, "leadfree soldering compound" means a soldering compound which, in accordance with the EC Directive "2002/95/EC on the Restriction of the Use of Certain Hazardous Substances in Electrical and Electronic Equipment", has lead content less than or equal to 0.1 wt.-%, preferably no lead.

Leadfree soldering compounds typically have lower ductility than lead-containing soldering compounds such that mechanical stresses between a connection element and a pane can be less well compensated. However, it has been found that critical mechanical stresses can be avoided by means of the connection element with compensator plates according to the invention. The soldering compound preferably contains tin and bismuth, indium, zinc, copper, silver, or compositions thereof. The tin content of the soldering compound according to the invention is 3 wt.-% to 99.5 wt.-%, preferably 10 wt.-% to 95.5 wt.-%, particularly preferably 15 wt.-% to 60 wt.-%. The content of bismuth, indium, zinc, copper, silver, or compositions thereof is, in the solder composition according to the invention, 0.5 wt.-% to 97 wt.-%, preferably 10 wt.-% to 67 wt.-%, wherein the content of bismuth, indium, zinc, copper, or silver can be 0 wt.-%. The solder composition can contain nickel, germanium, aluminum, or phosphorous with a content from 0 wt.-% to 5 wt.-%. The solder composition according to the invention contains most particularly preferably Bi40Sn57Ag3, Sn40Bi57Ag3, Bi59Sn40Ag1, Bi57Sn42Ag1, In97Ag3, In60Sn36.5Ag2Cu1.5, Sn95.5Ag3.8Cu0.7, Bi67In33, Bi33In50Sn17, Sn77.2In20Ag2.8, Sn95Ag4Cu1, Sn99Cu1, Sn96.5Ag3.5, Sn96.5Ag3Cu0.5, Sn97Ag3, or mixtures thereof.

In an advantageous embodiment, the soldering compound contains bismuth. It has been found that a bismuth-containing soldering compound results in particularly good adhesion of the connection elements according to the invention on the pane, while, at the same time, damage to the pane can be avoided. The bismuth content in the solder composition is preferably from 0.5 wt.-% to 97 wt.-%, particularly preferably from 10 wt.-% to 67 wt.-%, and most particularly preferably from 33 wt.-% to 67 wt.-%, in particular from 50 wt.-% to 60 wt.-%. The soldering compound preferably contains, in addition to bismuth, tin and silver or tin, silver, and copper. In a particularly preferred embodiment, the soldering compound contains at least 35 wt.-% to 69 wt.-% bismuth, 30 wt.-% to 50 wt.-% tin, 1 wt.-% to 10 wt.-% silver, and 0 wt.-% to 5 wt.-% copper. In a most particularly preferred embodiment, the soldering compound contains at least 49 wt.-% to 60 wt.-% bismuth, 39 wt.-% to 42 wt.-% tin, 1 wt.-% to 4 wt.-% silver, and 0 wt.-% to 3 wt.-% copper.

In another advantageous embodiment, the soldering compound contains from 90 wt.-% to 99.5 wt.-% tin, preferably from 93 wt.-% to 99 wt.-%, particularly preferably from 95 wt.-% to 98 wt.-%. The soldering compound preferably contains, in addition to tin, from 0.5 wt.-% to 5 wt.-% silver and from 0 wt.-% to 5 wt.-% copper.

The soldering compound flows out with an outflow width of preferably less than 1 mm from the intermediate space between the solder area of the compensator plates and the electrically conductive structure. In a preferred embodiment, the maximum outflow width is less than 0.5 mm and in particular roughly 0 mm. This is particularly advantageous with regard to the reduction of mechanical stresses in the pane, the adhesion of the connection element, and the reduction in the amount of solder. The maximum outflow width is defined as the distance between the outer edges of the solder area and the point of the soldering compound crossover, at which the soldering compound drops below a layer thickness of 50 μm. The maximum outflow width is measured on the solidified soldering compound after the soldering procedure. A desired maximum outflow width is obtained through a suitable selection of soldering compound volume and the vertical distance between the compressor plates and the electrically conductive structure, which can be determined by simple experiments. The vertical distance between the compensator plates and the electrically conductive structure can be predefined by an appropriate process tool, for example, a tool with an integrated spacer. The maximum outflow width can even be negative, i.e., pull back into the intermediate space formed by the soldering area of the compensator plates and the electrically conductive structure. In an advantageous embodiment of the pane according to the invention, the maximum outflow width in the intermediate space formed by the soldering area of the compensator plates and the electrically conductive structure is pulled back in a concave meniscus. A concave meniscus is created, for example, by increasing the vertical distance between the spacer and the conductive structure during the soldering procedure while the solder is still fluid. The advantage resides in the reduction of the mechanical stresses in the pane, in particular in the critical region that is present with a large soldering compound crossover.

In an advantageous embodiment of the invention, the contact surfaces of the compensator plates have spacers, preferably at least two spacers, particularly preferably at least three spacers. The spacers are preferably formed in one piece with the compensator plates, for example, by stamping or deep drawing. The spacers preferably have a width from $0.5\times10^{-4}$ m to $10\times10^{-4}$ m and a height from $0.5\times10^{-4}$ m to $5\times10^{-4}$ m, particularly preferably from $1\times10^{-4}$ m to $3\times10^{-4}$ m. By means of spacers, a homogeneous, uniformly thick, and uniformly fused layer of the soldering compound is obtained. Thus, mechanical stresses between the compensator plates and the pane can be reduced and the adhesion of the compensator plates can be improved. This is, in particular, especially advantageous with the use of leadfree soldering compounds that can compensate mechanical stresses less well due to their lower ductility compared to lead-containing soldering compounds.

In an advantageous embodiment of the invention, the compensator plates and/or the connection element are equipped with contact bumps that serve for making contact with the soldering tool during the soldering procedure. The contact bumps are arranged on the surface of the compensator plates facing away from the substrate opposite the contact surfaces or on the surface of the connection element facing away from the substrate in the region that is situated above the compensator plates. The contact bumps are preferably formed convexly curved at least in the region of contact with the soldering tool. The contact bumps preferably have a height from 0.1 mm to 2 mm, particularly preferably from 0.2 mm to 1 mm. The length and width of the contact bumps is preferably between 0.1 and 5 mm, most particularly preferably between 0.4 mm and 3 mm. The contact bumps are preferably formed in one piece with the compensator plates or the connection element, for example, by stamping or deep drawing. For soldering, electrodes whose contact side is shaped flat can be used. The electrode surface is brought into contact with the contact bump. During this process, the electrode surface is arranged parallel to the surface of the substrate. The contact area between the electrode surface and the contact bump forms the solder joint. The position of the solder joint is determined by the point on the convex surface of the contact bump that has the greatest vertical distance from the surface of the substrate. The position of the solder joint is independent of the position of the soldering electrode on the compensator plates or the connection element. This is particularly advantageous with regard to reproducible, uniform heat distribution during the soldering procedure. The heat distribution during the soldering procedure is determined by the position, the size, the arrangement, and the geometry of the contact bump.

The compensator plates preferably have, at least on the contact surface oriented toward the soldering compound, a coating (wetting layer), which contains nickel, copper, zinc, tin, silver, gold, or alloys or layers thereof, preferably silver. Thus, improved wetting of the compensator plates with the soldering compound and improved adhesion of the compensator plates are obtained.

The compensator plates according to the invention are preferably coated with nickel, tin, copper, and/or silver. The compensator plates are particularly preferably provided with an adhesion-promoting layer, preferably made of nickel and/or copper, and, additionally, with a solderable layer, preferably made of silver. The compensator plates according to the invention are coated most particularly preferably with 0.1 μm to 0.3 μm nickel and/or 3 μm to 20 μm silver. The compensator plates can be plated with nickel, tin, copper, and/or silver. Nickel and silver improve the current carrying capacity and corrosion stability of the compensator plates and the wetting with the soldering compound.

The connection element can optionally also have a coating. Coating of the connection element is, however, not essential since there is no direct contact between the connection element and the soldering compound. Thus, no optimization of the wetting properties of the connection element is required. Thus, the production costs of the pane according to the invention with a connection element and compensator plates are reduced since large area coating of the connection element can be dispensed with and only the usually significantly smaller surface of the compensator plates is coated.

In an alternative embodiment, the connection element has a coating that contains nickel, copper, zinc, tin, silver, gold, or alloys or layers thereof, preferably silver. Preferably, the connection element is coated with nickel, tin, copper, and/or silver. Most particularly preferably, the connection element is coated with 0.1 μm to 0.3 μm nickel and/or 3 μm to 20 μm silver. The connection element can be plated with nickel, tin, copper, and/or silver.

The shape of the compensator plates can form one or a plurality of solder depots in the intermediate space of the compensator plate and the electrically conductive structure. The solder depots and wetting properties of the solder on the compensator plates prevent the outflow of the soldering compound from the space. Solder depots can be implemented rectangular, rounded, or polygonal.

The invention further comprises a method of producing a pane with a connection element and one or a plurality of compensator plates including the following steps:

a) a connection element is electrically conductively attached on the top of one or a plurality of compensator plates,
b) a leadfree soldering compound is applied on at least one contact surface on the bottom of one or a plurality of compensator plates,
c) the compensator plates are arranged with the leadfree soldering compound on an electrically conductive structure on a substrate, and
d) the compensator plates are soldered to the electrically conductive structure.

The electrically conductive structure can be applied on the substrate using methods known per se, for example, by screen printing methods. The application of the electrically conductive structure can be done before, during, or after the process steps (a) and (b).

The soldering compound is preferably applied as platelets or flattened drops with a fixed layer thickness, volume, shape, and arrangement on the compensator plates. The layer thickness of the soldering compound platelet is preferably less than or equal to 0.6 mm. The shape of the soldering compound platelets preferably corresponds to the shape of the contact surface. If the contact surface is implemented, for example, as a rectangle, the soldering compound platelet preferably has a rectangular shape.

The introduction of energy during the electrical connecting of the compensator plates and the electrically conductive structure is done preferably with punches, thermodes, piston soldering, microflame soldering, preferably laser soldering, hot air soldering, induction soldering, resistance soldering, and/or with ultrasound.

Preferably, the connection element is welded or soldered or attached by means of a screw connection or a plug connection on the top of the compensator plates. Particularly preferably, the connection element is attached by electrode resistance welding, ultrasonic welding, or friction welding.

After installation of the pane in the motor vehicle, the connection element is welded or crimped to a sheet, a stranded wire, or a braid, for example, made of copper, and connected to the onboard electronics.

The invention further includes the use of the pane according to the invention with electrically conductive structures in motor vehicles, architectural glazing, or structural glazing, in particular in automobiles, rail vehicles, aircraft, or maritime vessels. A connection element with compensator plates is used for the connection of electrically conductive structures of the pane, for example, heating conductors or antenna conductors, to external electrical systems, for example, amplifiers, control units, or voltage sources. The invention includes in particular the use of the pane according to the invention in rail vehicles or automobiles, preferably as a windshield, rear window, side window, and/or roof panel, in particular as a heatable pane or as a pane with an antenna function.

BRIEF DESCRIPTION OF DRAWINGS

The invention is explained in detail with reference to drawings and exemplary embodiments. The drawings are schematic representations and are not true to scale. The drawings in no way restrict the invention. They depict.

DETAILED DESCRIPTION

Figure 1A:
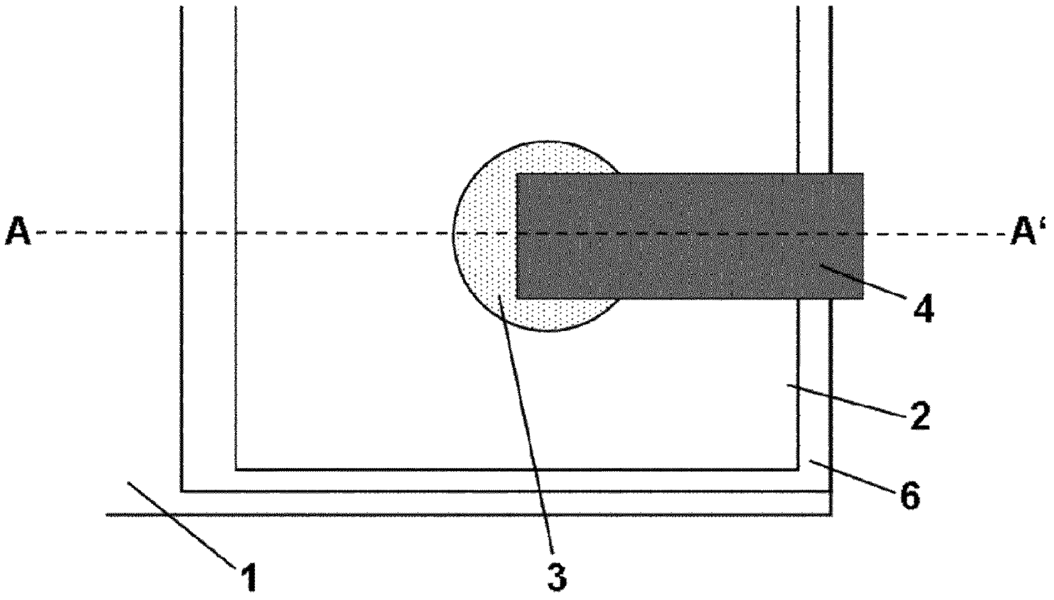
FIG. 1*a* a top plan view of a pane according to the invention with a connection element and compensator plate.
Figure 1B:
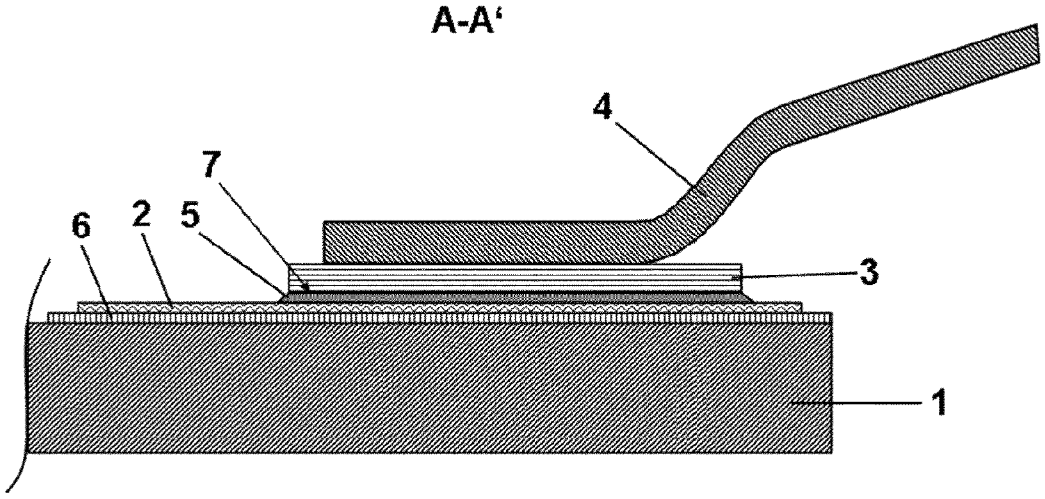
FIG. 1*b* a cross-section of the pane in accordance with FIG. 1*a* along the section line AA'.

FIGS. 1*a* and 1*b* depict a pane according to the invention with a connection element (4) and compensator plate (3). FIG. 1*b* depicts a cross-section along the section line AA'. The cut surfaces in FIG. 1*b* are displayed hatched. A masking screenprint (6) is applied on a substrate (1) made of a 3-mm-thick thermally prestressed single pane safety glass made of soda lime glass. The substrate (1) has a width of 150 cm and a height of 80 cm, with a connection element (4) with a compensator plate (3) mounted on the shorter side edge in the region of the masking screenprint (6). An electrically conductive structure (2) in the form of a heating conductor structure is applied on the surface of the substrate (1). The electrically conductive structure contains silver particles and glass frits, with the silver content greater than 90%. The electrically conductive structure (2) is widened to 10 mm in the edge region of the pane. In this region, a leadfree soldering compound (5), which connects the electrically conductive structure (2) to a contact surface (7) on the bottom of the compensator plate (3), is applied. The contact surface (7) and the leadfree soldering compound (5) are concealed in the top plan view in FIG. 1*a* by the compensator plate (3), but discernible in the cross-section (FIG. 1*b*).

After installation in the motor vehicle body, the contacting is concealed by the masking screenprint (6). The leadfree soldering compound (5) ensures a durable electrical and mechanical connection of the electrically conductive structure (2) to the compensator plate (3). The leadfree soldering compound (5) contains 57 wt.-% bismuth, 42 wt.-% tin, and 1 wt.-% silver. The leadfree soldering compound (5) has a thickness of 250 μm. The connection element (4) consists of a flat bent sheet with a foot whose bottom is welded onto the top of the compensator plate (3). The bending of the connection element is discernible in the cross-section (FIG. 1*b*). The electrical connection element (4) is made of copper of the material number CW004A (Cu-ETP) and has a contact surface with a width of 4 mm and a length of 6 mm. This material has low electrical resistance (1.8 μohm.cm) and is particularly suitable as a connection element (4) due to its high electrical conductivity. The material thickness of the connection element (4) is 0.8 mm. The compensator plate (3) consists of a circular stamped-out sheet and has a height (material thickness) of 0 5 mm and a diameter of 4 mm. The compensator plate (3) is made of steel of the material number 1.4509 per EN 10 088-2 (ThyssenKrupp Nirosta® 4509). The compensator plate (3) compensates mechanical stresses and thus makes possible the combination of a connection element (4) made of copper with a leadfree soldering compound (5). Thus, on the one hand, critical mechanical stresses in the pane are avoided, while, nevertheless, previously known connection elements (4) made of copper or copper alloys can still be used. Moreover, the manufacturing process can be simplified by standardization of the soldering procedure independently of the material and of the shape of the connection element (4), since the parameters of the soldering procedure depend only on the compensator plates (3) used. This result was surprising and unexpected for the person skilled in the art.

Figure 2A:
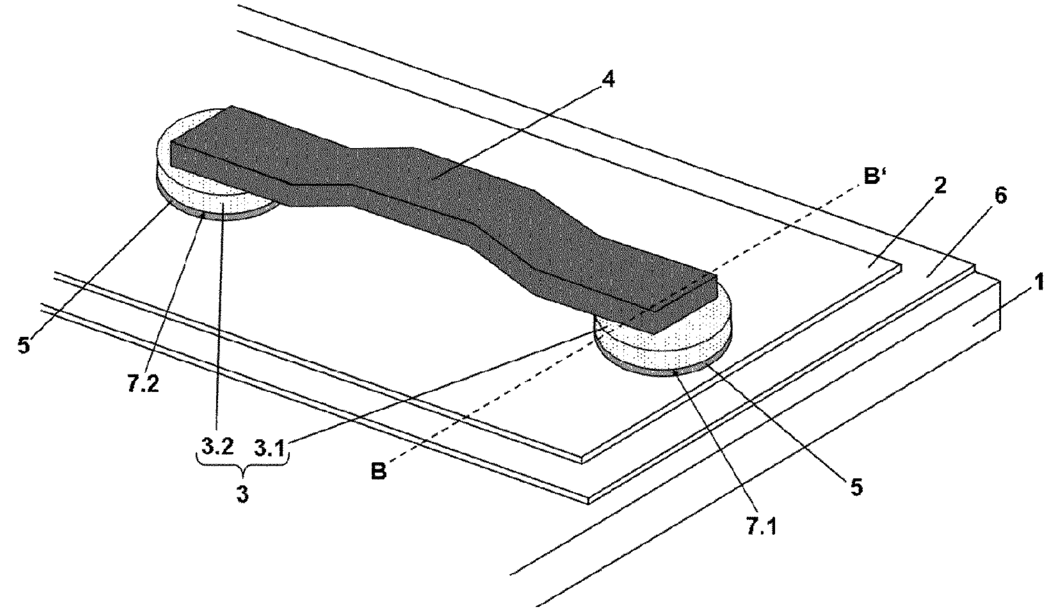
FIG. 2*a* a schematic perspective view of a pane according to the invention with a bridge-shaped connection element and two compensator plates.
Figure 2B:
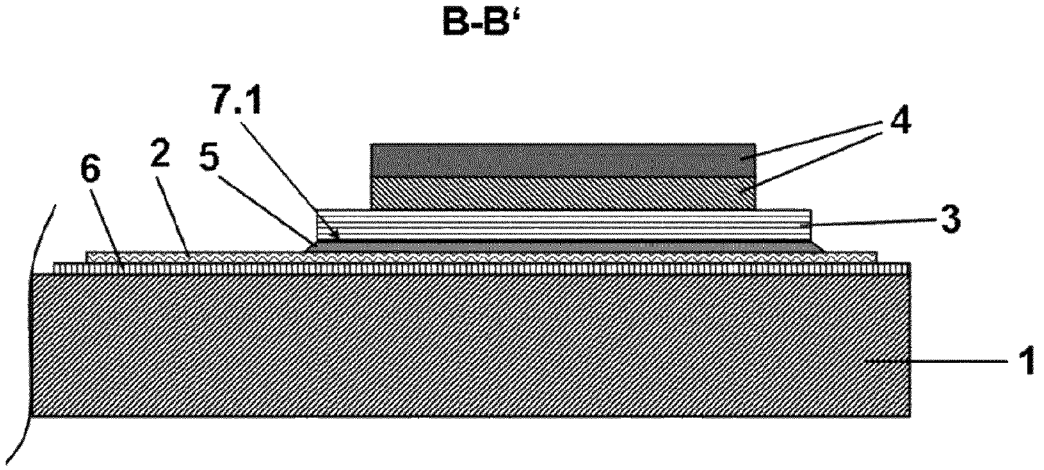
FIG. 2*b* a cross-section of the pane in accordance with FIG. 2*a* along the section line BB'.
Figure 2C:
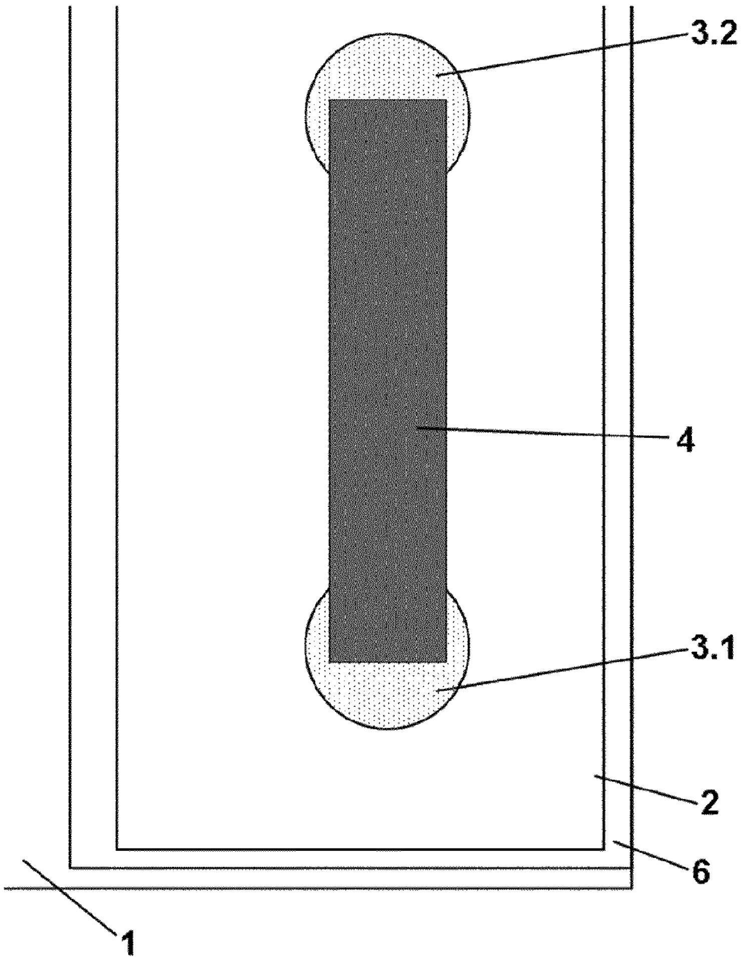
FIG. 2*c* a top plan view of the pane in accordance with FIG. 2*a*.

FIGS. 2*a*, 2*b*, and 2*c* depict different views of a pane according to the invention with a bridge-shaped connection element (4) and two compensator plates (3). FIG. 2*a* depicts a perspective view of the pane, FIG. 2*b* a cross-section along the section line BB', and FIG. 2*c* a top plan view. The cut surfaces are displayed hatched in FIG. 2*b*. A masking screenprint (6) is applied on a substrate (1) made of a 3-mm-thick thermally prestressed single pane safety glass made of soda lime glass. The substrate (1) has a width of 150 cm and a height of 80 cm, with a connection element (4) with compensator plates (3) mounted on the shorter side edge in the region of the masking screenprint (6). An electrically conductive structure (2) in the form of a heating conductor structure is applied on the surface of the substrate (1). The electrically conductive structure contains silver particles and glass frits, with the silver content greater than 90%. The electrically conductive structure (2) is widened to 10 mm in the region of the pane. In this region, a leadfree soldering compound (5), which connects the electrically conductive structure (2) to the contact surfaces (7.1, 7.2) on the bottom of the compensator plates (3), is applied. After installation in the motor vehicle body, the contacting is concealed by the masking screenprint (6). The leadfree soldering compound (5) ensures a durable electrical and mechanical connection of the electrically conductive structure (2) to the compensator plates (3) and the connection element (4). The leadfree soldering compound (5) contains 57 wt.-% bismuth, 42 wt.-% tin, and 1 wt.-% silver. The leadfree soldering compound (5) has a thickness of 250 μm. The connection element (4) has the shape of a bridge. The connection element (4) includes two feet, which rest on the first compensator plate (3.1) and the second compensator plate (3.2), as well as a bridge-shaped section that extends between the feet. In the bridge-shaped section, the connection element (4) rests neither on the compensator plates (3) nor on the electrically conductive structure (2). The electrical connection element (4) has a width of 4 mm and a length of 24 mm and is made of copper of the material number CW004A (Cu-ETP). This material has low electrical resistance (1.8 μohm.cm) and is particularly suitable as a connection element (4) due to its high electrical conductivity. The material thickness of the connection element (4) is 0.4 mm. The compensator plates (3.1, 3.2) consists of circular stamped-out sheets and have in each case a height (material thickness) of 0.5 mm and a diameter of 6 mm. The compensator plates (3.1, 3.2) are made of steel of the material number 1.4509 per EN 10 088-2 (ThyssenKrupp Nirosta® 4509). The compensator plates (3.1, 3.2) compensate mechanical stresses and thus make possible the combination of a connection element (4) made of copper with a leadfree soldering compound (5).

Figure 3:
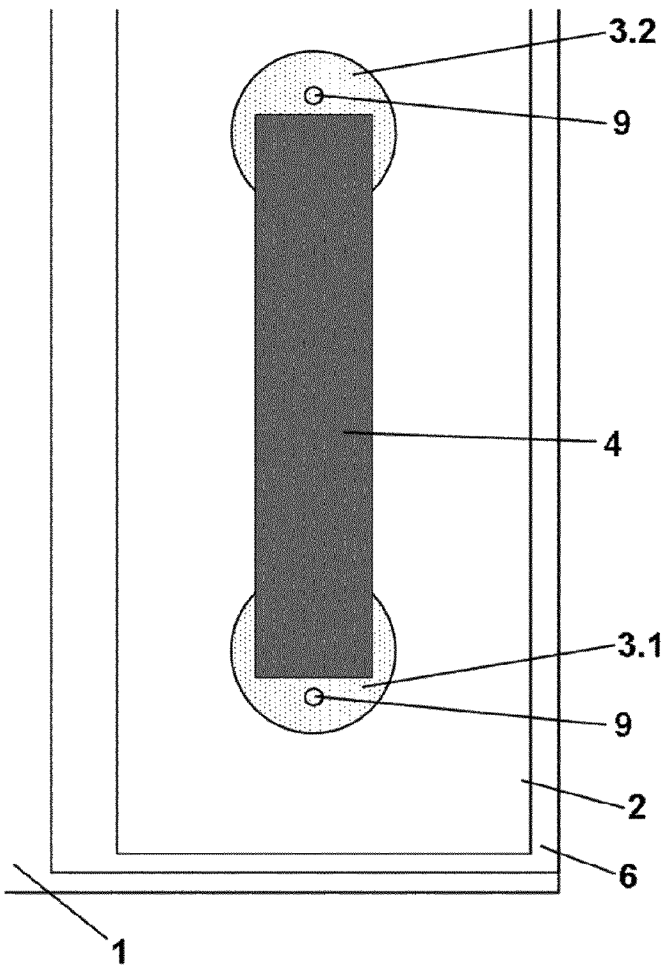
FIG. 3 a top plan view of the pane in accordance with FIG. 2*c*, wherein, additionally, one contact bump each is applied on the compensator plates.

FIG. 3 depicts a top plan view of the pane in accordance with FIG. 2*c*, wherein, additionally, one contact bump (9) each is applied on the compensator plates (3). The contact bumps (9) are arranged on the surface of the compensator plates (3) facing away from the substrate opposite the contact surfaces. The contact bumps (9) are stamped into the compensator plates (3) and thus formed in one piece therewith. The contact bumps (9) are formed as spherical segments and have a height of $2.5\times10^{4}$ m and a width of $5\times10^{4}$ m. The contact bumps (9) are used for contacting the compensator plates (3) with the soldering tool during the soldering procedure. By means of the contact bumps (9), reproducible and defined heat distribution is ensured independently of the exact positioning of the soldering tool.

Figure 4:
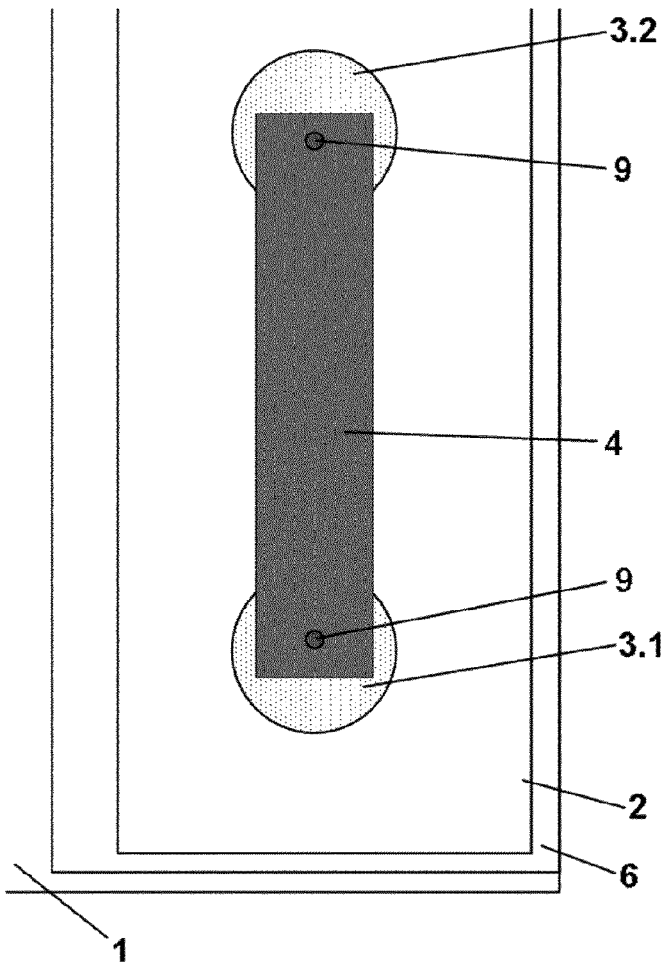
FIG. 4 a top plan view of the pane in accordance with FIG. 2*c*, wherein, additionally, two contact bumps are applied on the connection element.

FIG. 4 depicts a top plan view of the pane in accordance with FIG. 2*c*, wherein, additionally, two contact bumps (9) are applied on the connection element (4). The design of the contact bumps (9) corresponds to that described in FIG. 3, with, in contrast thereto, the contact bumps (9) arranged on the connection element (4) itself in the region that is situated above the compensator plates (3). This design is advantageous with regard to optimum heat distribution in the compensator plates (3) during the soldering procedure.

Figure 5A:
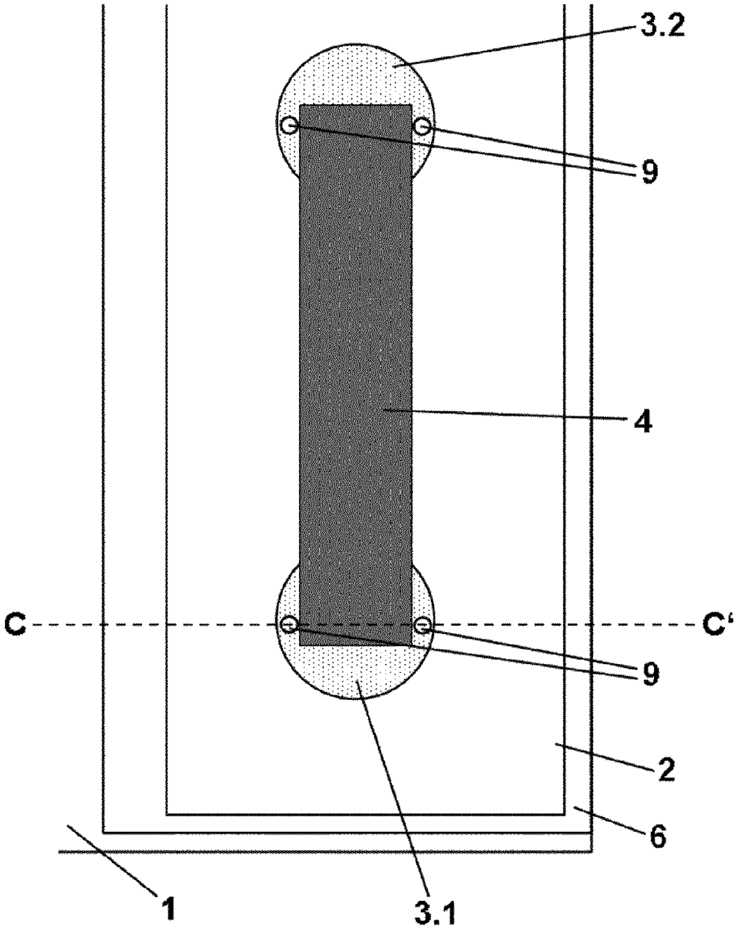
FIG. 5*a* a top plan view of the pane in accordance with FIG. 2*c*, wherein, additionally, two contact bumps each are applied on the compensator plates.

FIG. 5*a* depicts a top plan view of the pane in accordance with FIG. 2*c*, wherein, additionally, two contact bumps (9) each are applied on the compensator plates (3). The design of the contact bumps (9) corresponds to that described in FIG. 3, with, in contrast thereto, each compensator plate (3.1, 3.2) bearing two contact bumps (9). The contact bumps (9) flank the feet of the connection element(4) and are arranged laterally thereto.

Figure 5B:
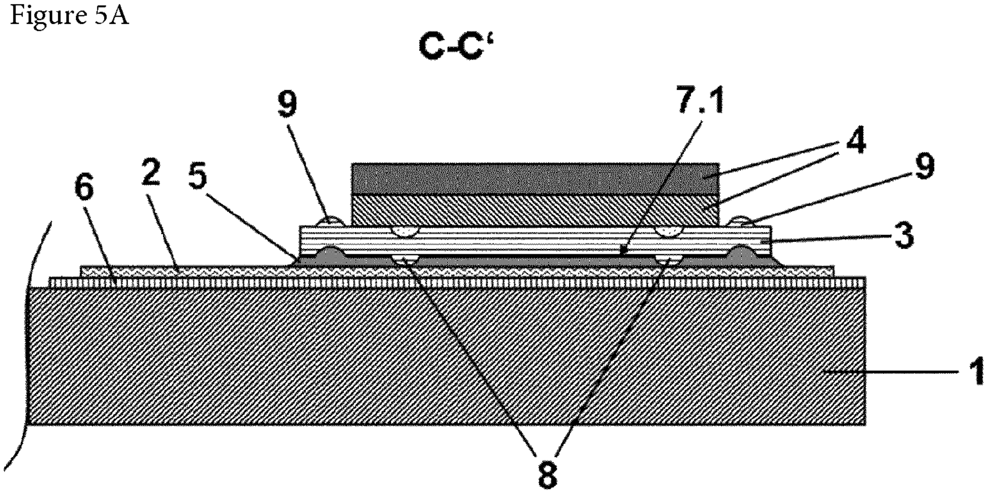
FIG. 5*b* a cross-section of the pane in accordance with FIG. 5*a* along the section line BB'.

FIG. 5*b* depicts a cross-section of the pane in accordance with FIG. 5*a* along the section line CC'. The cut surfaces are displayed hatched. Three spacers (8), of which two are discernible since they lie in the plane of the cross-section, are arranged on the first contact surface (7.1) of the first compensator plate (3.1). The second compensator plate (3.2) (not shown in this figure) is equipped with contact bumps (9) and spacers (8) analogously to the first compensator plate (3.1). The spacers (8) are stamped into the compensator plates (3) on the contact surfaces (7) and are thus formed in one piece therewith. The spacer (8) are formed as spherical segments and have a height of $2.5\times10^{4}$ m and a width of $5\times10^{4}$ m. The spacers (8) promote the formation of a uniform layer of the leadfree soldering compound (5). This is particularly advantageous with regard to the adhesion of the compensator plates (3). The contact bumps (9) are arranged on the surface of the compensator plates (3) facing away from the substrate (1) opposite the contact surfaces (7). The spacers (8) and the contact bumps (9) can, in principle, be positioned independently of each other; however, with stamping of the elements they must not overlap each other. The contact bumps (9) depicted in FIGS. 3 and 4 can also be used in combination with spacers (8).

Figure 6:
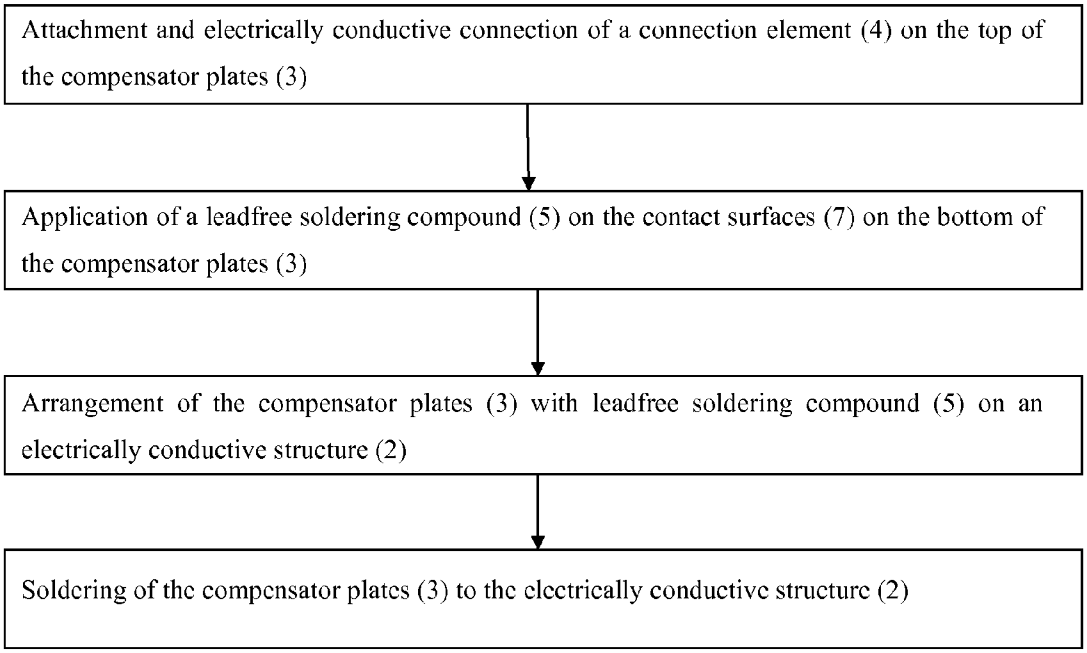
FIG. 6 a flowchart of the method according to the invention for producing a pane with a connection element and compensator plates.

FIG. 6 depicts a flow chart of the method according to the invention for producing a pane with a connection element (4) and compensator plates (3). First, a connection element (4) is electrically conductively attached on the top of the compensator plates (3). Then, a leadfree soldering compound (5) is applied on the bottom of the compensator plates (3) on at least one contact surface (7) and the compensator plates (3) with the leadfree soldering compound (5) are arranged on the electrically conductive structure (2). The compensator plates (3) are then soldered to the electrically conductive structure (2).

LIST OF REFERENCE CHARACTERS

1 transparent substrate
2 conductive structure
3 compensator plates
3.1 first compensator plate
3.2 second compensator plate
4 connection element
5 leadfree soldering compound
6 masking screenprint
7 contact surfaces
7.1 first contact surface
7.2 second contact surface
8 spacer
9 contact bumps
AA' section line
BB' section line
CC' section line

The invention claimed is:

1. A pane with at least one connection element with compensator plates, comprising:
- a substrate with an electrically conductive structure on at least one part of the substrate;
- at least one compensator plate on at least one part of the conductive structure;
- at least one electrical connection element on at least one part of the at least one compensator plate; and
- a leadfree soldering compound, which connects the compensator plate via at least one contact surface to at least one part of the electrically conductive structure,
  - wherein the difference of the coefficients of thermal expansion of the substrate and the compensator plate is less than $5\times10^{-6}/°$ C.,
  - wherein the connection element contains copper, and
  - wherein the electrical connection element is electrically conductively connected via a first compensator plate and a second compensator plate to the electrically conductive structure.

2. The pane according to claim 1, wherein the compensator plates and the contact surfaces have no corners.

3. The pane according to claim 1 wherein the compensator plates contain titanium, iron, nickel, cobalt, molybdenum, copper, zinc, tin, manganese, niobium, and/or chromium and/or alloys thereof, preferably iron alloys.

4. The pane according to claim 3, wherein the compensator plates contain at least 66.5 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, 0 wt.-% to 2 wt.-% niobium, and 0 wt.-% to 1 wt.-% titanium.

5. The pane according to claim 4, wherein the compensator plates contain at least 77 wt.-% to 84 wt.-% iron, 16 wt.-% to 18.5 wt.-% chromium, 0 wt.-% to 0.1 wt.-% carbon, 0 wt.-% to 1 wt.-% manganese, 0 wt.-% to 1 wt.-% niobium, 0 wt.-% to 1.5 wt.-% molybdenum, and 0 wt.-% to 1 wt.-% titanium.

6. The pane according to claim 1, wherein the connection element contains 45.0 wt.-% to 99.9 wt.-% copper, 0 wt.-% to 45 wt.-% zinc, 0 wt.-% to 15 wt.-% tin, 0 wt.-% to 30 wt.-% nickel, and 0 wt.-% to 5 wt.-% silicon.

7. The pane according to claim 6, wherein the connection element contains 58 wt.-% to 99.9 wt.-% copper, and 0 wt.-% to 37.0 wt.-% zinc, preferably 60 wt.-% to 80 wt.-% copper and 20 wt.-% to 40 wt.-% zinc.

8. The pane according to claim 1, wherein the electrically conductive structure contains at least silver, preferably silver particles and glass frits, and has a layer thickness from 5 μm to 40 μm.

9. The pane according to claim 1, wherein the substrate contains glass, preferably flat glass, float glass, quartz glass, borosilicate glass, and/or soda lime glass.

10. The pane according to claim 1, wherein the leadfree soldering compound contains tin, bismuth, indium, zinc, copper, silver, and/or mixtures and/or alloys thereof.

11. The pane according to claim 10, wherein the leadfree soldering compound contains 35 wt.-% to 69 wt.-% bismuth, 30 wt.-% to 50 wt.-% tin, 1 wt.-% to 10 wt.-% silver, and 0 wt.-% to 5 wt.-% copper.

12. A method for producing the pane according to claim 1, wherein:

a connection element is electrically conductively attached on the top of one or a plurality of compensator plates, a leadfree soldering compound is applied on at least one contact surface on the bottom of the compensator plates, the compensator plates are arranged with the leadfree soldering compound on an electrically conductive structure on a substrate, and the compensator plates are soldered to the electrically conductive structure.

13. A method of using a pane with electrically conductive structures, comprising:

providing the pane according to claim 1; and installing the pane in motor vehicles, aircraft, ships, architectural glazing, or structural glazing.

14. The method of using the pane according to claim 13, wherein the electrically conductive structures are heating conductors and/or antenna conductors.

* * * * *